United States Patent
Kunze

(10) Patent No.: US 9,562,509 B2
(45) Date of Patent: Feb. 7, 2017

(54) METHOD FOR REGULATING AN IGNITION TIME

(71) Applicant: Dr. Ing. h.c. F. Porsche Aktiengesellschaft, Stuttgart (DE)

(72) Inventor: Ulrich Kunze, Leingarten (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 45 days.

(21) Appl. No.: 14/622,955

(22) Filed: Feb. 16, 2015

(65) Prior Publication Data

US 2015/0240775 A1  Aug. 27, 2015

(30) Foreign Application Priority Data

Feb. 24, 2014 (DE) .................. 10 2014 102 325

(51) Int. Cl.
*F02P 5/15* (2006.01)
*F02P 5/152* (2006.01)

(52) U.S. Cl.
CPC .............. *F02P 5/152* (2013.01); *F02P 5/1527* (2013.01); *F02P 5/1502* (2013.01); *Y02T 10/46* (2013.01)

(58) Field of Classification Search
CPC ......... F02P 5/1502; F02P 5/152; F02P 5/1527; Y02T 10/46
USPC ........... 123/406.29, 406.34, 406.37–406.39; 701/104, 105, 111, 113
See application file for complete search history.

(56) References Cited

U.S. PATENT DOCUMENTS

| | | | | |
|---|---|---|---|---|
| 5,165,378 A * | 11/1992 | Miyashita | .............. | F02P 5/152 123/406.35 |
| 5,992,385 A * | 11/1999 | Hess | .............. | F02P 5/152 123/406.23 |
| 6,283,093 B1 * | 9/2001 | Lautenschuetz | ......... | F02P 5/152 123/406.33 |
| 6,311,671 B1 * | 11/2001 | Torno | .............. | F02P 5/1521 123/406.29 |
| 6,945,229 B1 * | 9/2005 | Zhu | .............. | F02P 5/1522 123/406.21 |
| 2001/0002590 A1 | 6/2001 | Cianciara et al. | | |
| 2002/0073964 A1 * | 6/2002 | Franke | .............. | F02P 5/152 123/406.33 |
| 2003/0154958 A1 * | 8/2003 | Franke | .............. | F02D 41/266 123/406.16 |
| 2006/0124107 A1 | 6/2006 | Sauler | | |
| 2009/0101109 A1 * | 4/2009 | Bauer | .............. | F02P 5/152 123/406.37 |
| 2009/0159045 A1 | 6/2009 | Hitomi et al. | | |
| 2013/0226434 A1 * | 8/2013 | Urano | .............. | F02D 13/0219 701/102 |

FOREIGN PATENT DOCUMENTS

| | | |
|---|---|---|
| DE | 4300929 C1 | 1/1994 |
| DE | 19539171 A1 | 4/1997 |

(Continued)

*Primary Examiner* — John Kwon
*Assistant Examiner* — Johnny H Hoang
(74) *Attorney, Agent, or Firm* — Leydig, Voit & Mayer, Ltd.

(57) ABSTRACT

A method for regulating an ignition time for combustion processes of an internal combustion engine includes determining an ignition angle for a combustion process as a function of an operating parameter of the internal combustion engine, based on a characteristic diagram and as a function of a knocking limit offset.

9 Claims, 1 Drawing Sheet

(56) References Cited

FOREIGN PATENT DOCUMENTS

| | | |
|---|---|---|
| DE | 19827704 A1 | 12/1999 |
| DE | 10051974 A1 | 5/2002 |
| DE | 10257994 A1 | 7/2004 |

* cited by examiner

METHOD FOR REGULATING AN IGNITION TIME

CROSS REFERENCE TO RELATED APPLICATIONS

Priority is claimed to German Patent Application No. DE 10 2014 102 325.0, filed on Feb. 24, 2014, the entire disclosure of which is hereby incorporated by reference herein.

FIELD

The invention relates to a method for regulating an ignition time for combustion processes of an internal combustion engine, and to an engine control unit.

BACKGROUND

There are ways to monitor an ignition time with respect to knocking combustion during combustion processes of an internal combustion engine, and in the event of knocking combustion being detected to adjust the ignition angle of the affected cylinder in the retarded direction by an ignition angle offset as a measure during the next combustion process. Subsequently, the ignition angle offset is eliminated again by means of a slow adjustment of the ignition angle in the early direction. If knocking combustion occurs again before the reduction in the adjustment of the ignition angle in the retarded direction is completely eliminated to the ignition angle which is provided, immediate adjustment of the ignition angle in the retarded direction by the ignition angle offset is carried out once more. As a result of the rapid reduction in the ignition angle during the knocking event and the subsequent renewed slow approach to the knocking limit, the internal combustion engine can be operated right up against the knocking limit with an optimized ignition angle.

SUMMARY

In an embodiment, the present invention provides a method for regulating an ignition time for combustion processes of an internal combustion engine including determining an ignition angle for a combustion process as a function of an operating parameter of the internal combustion engine, based on a characteristic diagram and as a function of a knocking limit offset.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
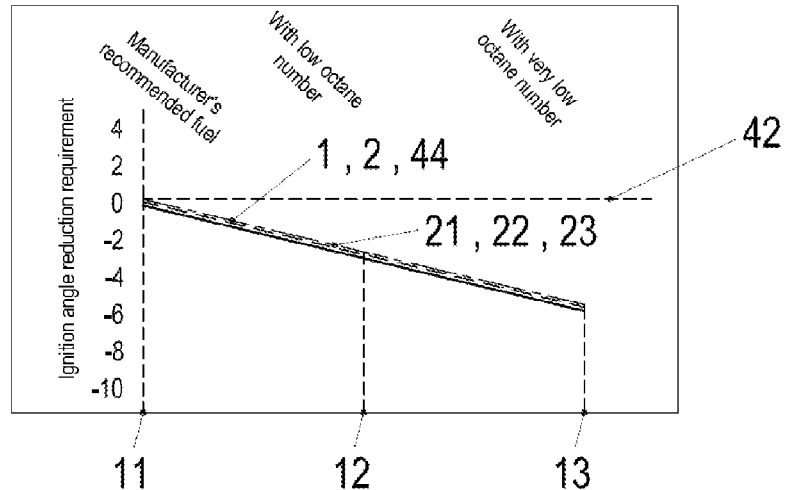
FIG. 1 shows a diagram for a first operating point with characteristic curves for a virtual knocking limit, an ignition angle reduction requirement and a knocking limit offset.

In an embodiment the invention provides an improved method for regulating an ignition time for combustion processes of an internal combustion engine.

An advantage of the described method is that precise and rapid regulation of the ignition time near to the knocking limit is achieved. This is achieved in that the ignition angle for a combustion process of the internal combustion engine is determined as a function of an operating parameter of the internal combustion engine, on the basis of a characteristic diagram and as a function of a knocking limit offset.

In a further embodiment, the ignition angle is determined as a function of a basic ignition angle and as a function of an ignition angle difference value. This makes simple and precise determination of the ignition time possible.

In a further embodiment, the ignition angle difference value is stored in a characteristic diagram as a function of an operating parameter of the internal combustion engine. Rapid regulation can therefore be achieved.

In a further embodiment, an ignition angle diagram is used. This method provides the advantage that it is not necessary to provide ignition angle difference values.

In a further embodiment, the knocking limit offset depends on an operating parameter of the internal combustion engine. As a result, the regulation becomes more precise.

In a further embodiment, in order to regulate the ignition time a basic ignition angle is determined as a function of an operating parameter of the internal combustion engine, wherein the basic ignition angle is shifted by a correction angle in the direction of a more retarded ignition time, wherein the correction angle is calculated as a function of a characteristic diagram and a knocking limit offset. This makes the method more precise.

In one embodiment, a further improvement in the method is achieved in that the knocking limit offset is determined or adapted using a learning method while the internal combustion engine is operated. It is therefore not necessary to intervene in the complex characteristic diagram for the basic ignition angle or in the characteristic diagram for the ignition angle difference value. It is sufficient if the knocking limit offset is adapted for various operating points and/or qualities of fuels, in particular the octane number, while the internal combustion engine is operated, for example on a test bench or during daily use of the motor vehicle.

As a result of the use of the knocking limit offset it is possible also to rapidly make available a precise and actual knocking limit for ranges even though these ranges are not traveled in, or hardly traveled in.

In a further embodiment, the correction angle is calculated on the basis of a virtual correction angle. The virtual correction angle results from the addition of the ignition angle difference value and of the knocking limit offset. In addition, the virtual correction angle is compared with a predefined threshold. The predefined threshold can correspond, for example, to the value of zero. If the virtual correction angle undershoots the predefined threshold, the virtual correction angle is used as a real correction angle for correcting the basic ignition angle. In this way, it is possible to ensure that when the virtual correction angle is used the ignition time is not shifted into ranges in which the shifting is not necessary. In particular, shifting of the ignition time in the direction of ignition which is earlier compared to the basic ignition angle can be prohibited.

In a further embodiment, the knocking limit offset is stored in the form of a characteristic curve or a characteristic diagram, wherein the knocking limit offset depends, in particular, on the quality of the burnt fuel. In particular, the knocking limit offset can depend on the octane number of the burnt fuel. It is therefore not necessary to determine the characteristic diagram for the ignition angle difference value for every quality of the burnt fuel.

In a further embodiment, the characteristic diagram is determined for a fuel with a predefined octane number, and the characteristic diagram is provided with a compensation value for fuels with different octane numbers. In this way it is not necessary to determine a characteristic diagram experimentally or computationally for fuels with different octane numbers every time. The differences in the tendency of the various fuel qualities to knock is taken into account by the knocking limit offset.

In a further embodiment, the quality of the fuel, in particular the octane number of the fuel, is detected and taken into account in the selection of the knocking limit offset and/or in the selection of the ignition angle difference value from the characteristic diagram.

FIG. 1 shows a diagram in which an ignition angle reduction requirement is plotted on the y axis and different fuel qualities are plotted on the x axis, wherein the fuel quality decreases as the distance from the y axis in the octane number increases. FIG. 1 illustrates a first measuring point 11 for a manufacturer's recommended fuel, i.e. a high octane number, second measuring point 12 for a fuel which has a low octane number, and a third measuring point 13 for a fuel which has a very low octane number. A manufacturer's recommended fuel is understood to be, for example, a fuel with an octane number of 98. A fuel with a low octane number is understood to be, for example, a fuel with an octane number of 95. A fuel with a very low octane number is understood to be a fuel with an octane number of 91. The quality of the fuel can be detected on the basis of knocking regulation while the internal combustion engine is operating. In addition, a sensor or a measuring method can be provided for detecting the quality of the fuel, in particular the octane number, with which the engine control unit detects the quality of the fuel.

Furthermore, measured values for the virtual knocking limit 1, the ignition angle reduction requirement 2 and the knocking limit offset 44 are illustrated at each of the three measuring points 11, 12, 13. The virtual knocking limit of the three measuring points 11, 12, 13 is connected to a first characteristic curve 21. The values for the ignition angle reduction requirement of the three measuring points 11, 12, 13 are connected to a second characteristic curve 22. The knocking limit offsets 44 for the three measuring points 11, 12, 13 are connected to a third characteristic curve 23. The characteristic curves have been illustrated in the form of a linear approximation.

In addition, in FIG. 1, an ignition angle difference value 42 for the defined operating point and the manufacturer's recommended fuel, in the case of which ignition angle difference value 42 the ignition takes place close to the limit for a knocking combustion process, has been entered in the form of a dashed line.

In the illustrated example, the internal combustion engine is at an operating point at which the values for the virtual knocking limit 1, the ignition angle reduction requirement 2 and the knocking limit offset 44 for the three fuel qualities, i.e. for the three measuring points 11, 12, 13, run in a line.

The knocking limit offset 44 has the value 0 at the defined operating point for the manufacturer's recommended fuel. The knocking limit offset 44 has the value −3 at the defined operating point for a fuel with a low octane number. The knocking limit offset 44 has the value −6 at the defined operating point for a fuel with a very low octane number. It is therefore easily possible to adapt the characteristic diagram 24 for the ignition angle difference values using the third characteristic curve 23 for the knocking limit offset 44 for different qualities of the fuel.

The third characteristic curve 23 for the values of the knocking limit offset 44 can be obtained experimentally on an engine test bench or during ongoing operation. In addition, a theoretical model can also be used to obtain the knocking limit offsets 44 for various qualities of fuel, in particular for various octane numbers.

Figure 2:
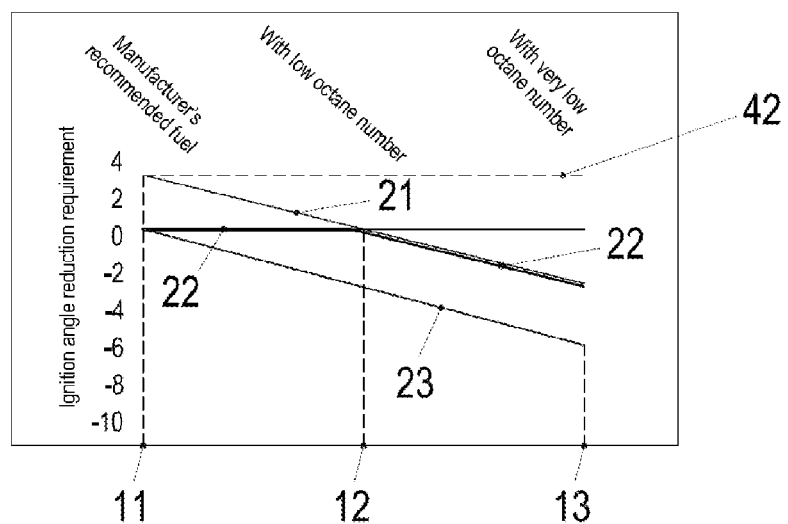
FIG. 2 shows a diagram for a second operating point comprising characteristic curves for the virtual knocking limit, the ignition angle reduction requirement and the knocking limit offset.

FIG. 2 shows a schematic illustration of a diagram for a second operating point of the internal combustion engine, in which diagram an ignition angle reduction requirement is plotted along the y axis. A first, a second and a third measuring point 11, 12, 13 are plotted along the x axis, wherein the measuring points 11, 12, 13 have been detected for different qualities of the burnt fuel. The first measuring point 11 corresponds to a manufacturer's recommended fuel, i.e. to a fuel with a high octane number. The second measuring point 12 corresponds to a fuel which has a low octane number. The third measuring point 13 corresponds to a fuel which has a very low octane number. The fuels were each measured at the same operating point of the internal combustion engine. The first characteristic curve 21 represents the measuring points of the virtual knocking limit 1. The second characteristic curve 22 represents the measuring points of the ignition angle reduction requirement. The third characteristic curve 23 represents the measuring points of the knocking limit offset 44. At this operating point, the first characteristic curve 21 has different values than the third characteristic curve 23.

In order to acquire the measured values or characteristic curves, the knocking limit for the operation with manufacturer's recommended fuel can be determined for the internal combustion engine, for example on an engine test bench at any desired number of operating points of the internal combustion engine as a function of the respective ignition angle. The ignition angle for the knocking limit, i.e. at the start of a knocking combustion process, can be obtained in different ways. One possibility is to obtain the knocking limit with a fuel with a low octane number and to subsequently use a correction value to compensate for a fuel with a high octane number or a very low octane number. The ignition angle for the knocking limit which is obtained can be stored in a characteristic diagram in the engine control unit, either as an absolute value or as an ignition angle difference on a basic ignition angle. Other reference systems for the stored ignition angles are also conceivable. The resulting ignition angles can also certainly lie in an excessively early range which cannot be traveled in, i.e. a range which is therefore virtual. In FIG. 2, the ignition angle reduction requirement values >0 correspond to an excessively early range and are therefore not implemented.

If the knocking limit is reached at an operating point while the internal combustion engine is operating after the characteristic diagram has been finished, the virtual knocking limit 1 can be corrected to the real knocking limit by a learning knocking limit offset, for example. The attainment of the real knocking limit can be detected, for example, by means of the evaluation of the signal of a solid-borne sensor through the comparison with a threshold or by intervention of the knocking regulating means.

In the entire operating range, the real, expected knocking limit is therefore known even for ranges which cannot be traveled in. Further knocking regulating measures and knocking detection measures can therefore be taken.

For example, limitation of the ignition angle in the direction of early ignition as a function of the virtual knocking limit can be carried out. In addition, measures such as, for example, sensitive knocking detection during operation right up against the expected knocking limit and insensitive detection, which is robust with respect to incorrect detection, during operation at a large distance from the knocking limit are conceivable on the basis of the virtual known knocking limit.

An ignition angle reduction requirement in the positive range means adjustment of the basic ignition angle 41 in the direction of early ignition. An ignition angle reduction requirement in a negative range means the adjustment of the basic ignition angle 41 in the direction of retarded ignition.

In FIG. 2, the ignition angle difference value 42 is plotted with the absolute value 44 as a dashed characteristic curve for the present operating point. The ignition angle difference value 42 is constant in the characteristic diagram 24 for various types of fuel.

The characteristic diagram 24 has been obtained for a manufacturer's recommended fuel, and the ignition angle is selected at the present operating point in such a way that knocking combustion just fails to occur. According to FIG. 2, the basic ignition angle could be adjusted in the early direction by 3° without knocking combustion occurring.

For various operating points of the internal combustion engine, a characteristic curve is stored in each case for the knocking limit offset as a function of the quality of the fuel. In FIG. 2, the third characteristic curve 23 corresponds to the knocking limit offset 44 for a defined operating point as a function of the quality of the fuel used. The characteristic curve for the knocking limit offset 44 at the defined operating point for the manufacturer's recommended fuel therefore has the value 0. The characteristic curve for the knocking limit offset 44 has the value −3 at the defined operating point for a fuel with a low octane number. The characteristic curve for the knocking limit offset 44 has the value −6 at the defined operating point for a fuel with a very low octane number. In this way, the characteristic diagram 24 can be adapted easily using the knocking limit offset for different qualities of the fuel.

Figure 3:
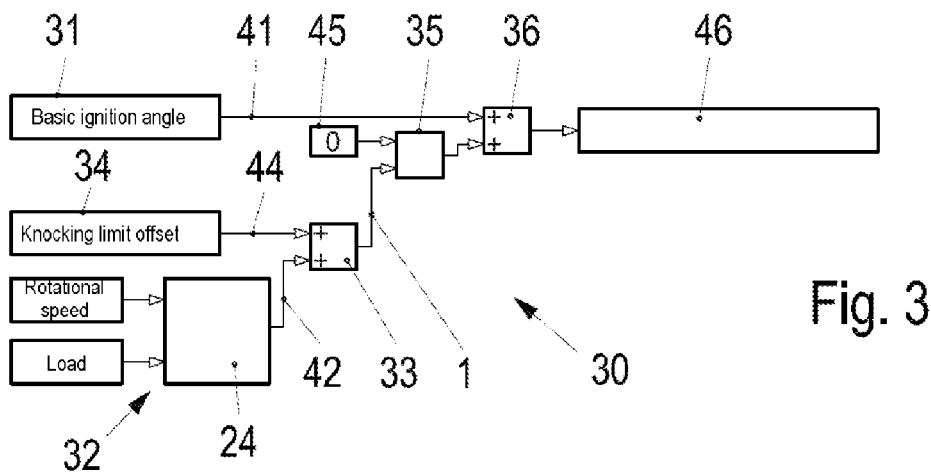
FIG. 3 shows a schematic illustration of a design of an engine control unit for carrying out the method.

FIG. 3 shows a schematic illustration of parts of an engine control unit 30 which is designed to carry out the method described. The engine control unit 30 calculates a basic ignition angle 41 in a first program block 31 as a function of an operating parameter of the internal combustion engine. For this purpose, corresponding characteristic curves, characteristic diagrams and programs are stored in the engine control unit 30. Furthermore, the engine control unit 30 obtains an ignition angle difference value 42 on the basis of a characteristic diagram 24 in a second program block 32, as a function of the present operating point of the internal combustion engine, in particular as a function of the rotational speed and/or the load. The ignition angle difference value 42 is fed to an adder element 33. In addition, the engine control unit 30 obtains a knocking limit offset 44 in a third program block 34. The knocking limit offset is also fed to the adder element 33. In order to obtain the knocking limit offset 44, the engine control unit 30 uses a characteristic curve such as, for example, the characteristic curve which is illustrated in FIG. 2 and in which the value of the knocking limit offset 44 is stored as a function of the fuel used and as a function of the present operating point of the internal combustion engine. Instead of a characteristic curve, a characteristic diagram can also be used for the knocking limit offset 44, which diagram has a value for the knocking limit offset 44 as a function of the operating point and the quality of the fuel. Furthermore, the knocking limit offset 44 can also be calculated as a function of an operating point of the internal combustion engine. An operating point of the internal combustion engine is also understood to be an operating parameter such as the quality, i.e. the octane number of the fuel used.

The adder element 33 adds the knocking limit offset 44 and the ignition angle difference value 33 and therefore determines a virtual knocking limit 1. The virtual knocking limit 1 is fed to a comparison block 35. The comparison block 35 compares the virtual knocking limit 1 with a predefined comparison value 45. The comparison value 45 can be defined, for example, by the value 0. The comparison block 35 constitutes a limiting function, wherein only the virtual knocking limits 1 are passed on to a second adder element 36 if the virtual knocking limits 1 are below the comparison value 45. In the example described, only the virtual knocking limits 1 which are lower than 0, i.e. are in the negative range, are passed on to the second adder element 36. The second adder element 36 adds the negative virtual knocking limit 1 to the basic ignition angle 41 and therefore obtains the resulting ignition angle 46. The engine control unit 30 ignites the following combustion at the resulting ignition angle 46.

The characteristic diagram or the characteristic curve for the values of the knocking limit offset 44 can be determined, for example, by incrementally adding an increasing knocking limit offset on the basis of the ignition angle difference value 42 until a knocking combustion process starts. When the knocking combustion occurs, the current value is not stored but instead the preceding value of the knocking limit offset 44 as a knocking limit offset for the present operating point in the characteristic curve or the characteristic diagram. In this way, precise adjustment for rapid predefinition of an ignition angle close to the knocking limit can be achieved using the knocking limit offset.

In a further embodiment, instead of the basic ignition angle and the ignition angle difference characteristic diagram 24 it is also possible to use an ignition angle diagram as a function of operating points of the internal combustion engine. The ignition angle diagram is, for example, also obtained experimentally for a defined quality of the fuel for various operating points. The ignition angle diagram is corrected with the knocking limit offset 44, but shifting of the ignition angle in the direction of early ignition is prohibited.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for regulating an ignition time for combustion processes of an internal combustion engine, the method comprising:
   determining an ignition angle for a combustion process as a function of selected operating parameter of the internal combustion engine, based on a characteristic diagram and as a function of a knocking limit offset,
   wherein the knocking limit offset depends on the selected operating parameter of the internal combustion engine, and
   wherein the knocking limit offset for an operating point of the internal combustion engine is adapted using a learning method, wherein the knocking limit offset is changed during the learning method until the knocking limit is reached, and wherein a most recent value of the knocking limit offset, before the knocking limit for the operating point is reached, is stored as the knocking limit offset in the characteristic diagram.

2. The method as recited in claim 1, wherein the ignition angle is calculated as a function of a basic ignition angle and as a function of an ignition angle difference value.

3. The method as recited in claim 2, wherein the ignition angle difference value is stored in the characteristic diagram as a function of the selected operating parameter of the internal combustion engine.

4. The method as recited in claim 2, wherein the ignition angle difference value and the knocking limit offset are added, and a virtual correction angle is obtained, wherein the virtual correction angle is used as a correction angle by which the basic ignition angle is shifted in a retarded direction if the virtual correction angle is smaller than a predefined threshold.

5. The method as recited in claim 4, wherein the predefined threshold corresponds to a value of zero.

6. The method as recited in claim 2, wherein the characteristic diagram for the ignition angle difference value is determined for a fuel with a predefined octane number.

7. The method as recited in claim 1, wherein the characteristic diagram is an ignition angle diagram.

8. The method as recited in claim 1, wherein the knocking limit offset depends on a quality of a fuel being burned in the internal combustion engine.

9. An engine control unit configured to execute a method for regulating an ignition time for combustion processes of an internal combustion engine, the method comprising:
   determining an ignition angle for a combustion process as a function of a selected operating parameter of the internal combustion engine, based on a characteristic diagram and as a function of a knocking limit offset,
   wherein the knocking limit offset depends on the selected operating parameter of the internal combustion engine, and
   wherein the knocking limit offset for an operating point of the internal combustion engine is adapted using a learning method, wherein the knocking limit offset is changed during the learning method until the knocking limit is reached, and wherein a most recent value of the knocking limit offset, before the knocking limit for the operating point is reached, is stored as the knocking limit offset in the characteristic diagram.

* * * * *